United States Patent
Nees et al.

(10) Patent No.: US 6,648,384 B2
(45) Date of Patent: Nov. 18, 2003

(54) BUMPER CRUSH TOWER WITH RINGS OF VARIED STRENGTH

(75) Inventors: Rainer B. Nees, West Olive, MI (US); David W. Heatherington, Spring Lake, MI (US); Scott C. Glasgow, Grand Haven, MI (US); Jack Russell, North Muskegon, MI (US)

(73) Assignee: Shape Corporation, Grand Haven, MI (US)

( * ) Notice: Subject to any disclaimer, the term of this patent is extended or adjusted under 35 U.S.C. 154(b) by 50 days.

(21) Appl. No.: 09/964,914

(22) Filed: Sep. 27, 2001

(65) Prior Publication Data

US 2003/0057720 A1 Mar. 27, 2003

(51) Int. Cl.[7] .............................................. B60R 19/26
(52) U.S. Cl. ..................... 293/132; 293/133; 296/188; 296/189
(58) Field of Search ................ 293/120, 122, 293/132, 133, 154, 155; 296/188, 189

(56) References Cited

U.S. PATENT DOCUMENTS

| | | | |
|---|---|---|---|
| 3,511,345 A | 5/1970 | Takamatsu et al. | |
| 3,599,757 A | 8/1971 | Takamatsu et al. | |
| 3,706,359 A | 12/1972 | Skralskis | |
| 3,912,295 A | * 10/1975 | Eggert, Jr. .................... | 293/63 |
| 3,972,744 A | 8/1976 | Cantrell | |
| 3,983,962 A | 10/1976 | Torke | |
| 3,998,485 A | * 12/1976 | Putter et al. ................... | 293/70 |
| 4,010,969 A | 3/1977 | Cantrell et al. | |
| 4,023,652 A | 5/1977 | Torke | |
| 4,152,012 A | 5/1979 | Reidelbach et al. | |
| 4,194,763 A | 3/1980 | Reidelbach et al. | |
| 5,224,574 A | * 7/1993 | Thum .......................... | 296/188 |
| 5,314,229 A | * 5/1994 | Matuzawa et al. .......... | 293/133 |
| 5,403,049 A | 4/1995 | Ebbinghaus | |
| 5,492,207 A | * 2/1996 | Clausen ....................... | 188/337 |
| 5,566,777 A | 10/1996 | Trommer et al. | |
| 5,732,801 A | 3/1998 | Gertz | |
| 5,972,134 A | 10/1999 | Buschsieweke et al. | |
| 5,984,390 A | * 11/1999 | Kamp et al. ................. | 293/132 |
| 6,106,039 A | * 8/2000 | Maki ........................... | 293/132 |
| 6,139,655 A | 10/2000 | Kowalski et al. | |
| 6,174,009 B1 | 1/2001 | McKeon | |
| 6,176,530 B1 | 1/2001 | Gollungberg | |
| 6,179,355 B1 | * 1/2001 | Chou et al. .................. | 293/132 |
| 6,203,098 B1 | 3/2001 | Motozawa et al. | |
| 6,231,095 B1 | 5/2001 | Chou et al. | |
| 6,258,465 B1 | 7/2001 | Oka et al. | |
| 6,293,587 B1 | * 9/2001 | Lapic et al. ................. | 293/133 |
| 6,371,859 B1 | * 4/2002 | Gibson ........................ | 464/183 |
| 6,554,333 B2 | * 4/2003 | Shimotsu et al. ........... | 293/132 |

FOREIGN PATENT DOCUMENTS

| | | | | |
|---|---|---|---|---|
| DE | 4302878 | * | 8/1993 | .................. 293/133 |
| DE | 4302879 | * | 8/1993 | .................. 293/133 |
| DE | 4239460 | * | 5/1994 | .................. 293/132 |
| DE | 4401865 | * | 8/1994 | .................. 293/133 |
| DE | 4316164 | * | 11/1994 | .................. 293/133 |
| JP | 58089475 | | 5/1983 | |
| JP | 04310477 | | 11/1992 | |
| JP | 6-211091 | * | 8/1994 | .................. 293/133 |
| JP | 07101354 | | 4/1995 | |

* cited by examiner

Primary Examiner—Joseph D. Pape
Assistant Examiner—H. Gutman
(74) Attorney, Agent, or Firm—Price, Heneveld, Cooper, DeWitt & Litton

(57) ABSTRACT

An energy-absorbing crush tower for a vehicle bumper system includes a tube made of a continuous contiguous material, such as a heat-treatable steel. The tube has first and second ring sections connected by an interconnecting section. The first ring section is heat-treated to a high material strength, such as about 120 KSI tensile strength, which is substantially higher than the second ring section, which is kept at about 60 KSI tensile strength. The interconnecting section has a frustoconically-shaped portion forming a ramp. By this arrangement, upon the bumper system receiving an end impact parallel a length of the tube, the first and second ring sections telescopingly collapse with a predictable and consistent multi-phase deformation sequence where a third ring section forms between the first and second ring sections. A method related to the above is also disclosed and claimed.

15 Claims, 1 Drawing Sheet

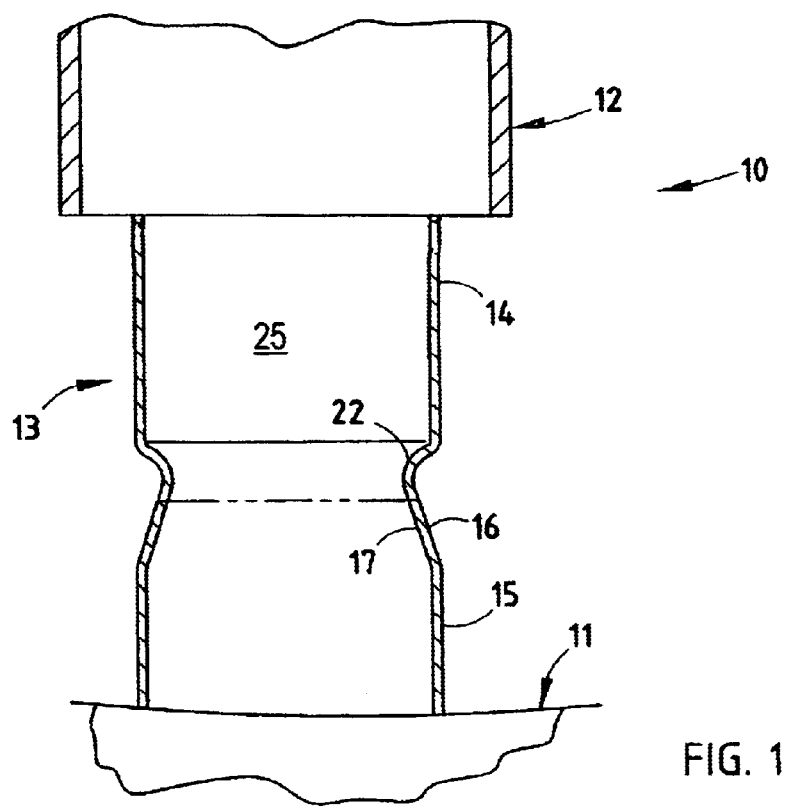
FIG. 1
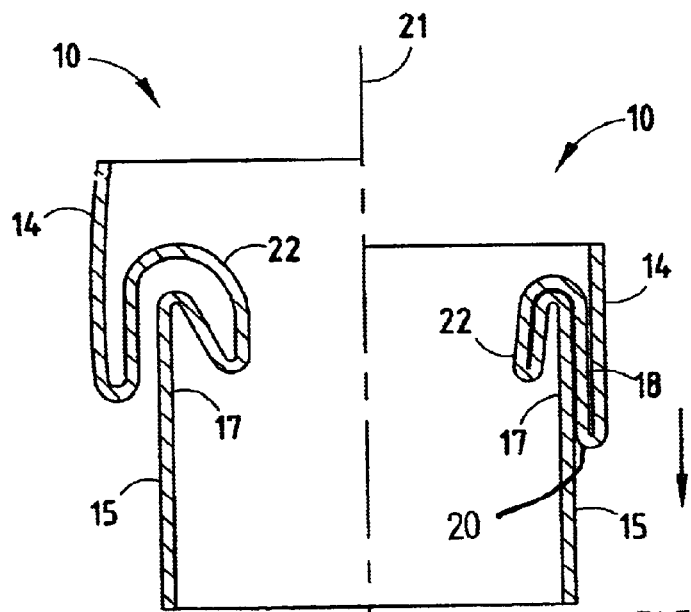
FIG. 2
FIG. 3

BUMPER CRUSH TOWER WITH RINGS OF VARIED STRENGTH

BACKGROUND

The present invention relates to vehicle bumper systems having crush towers for supporting bumper beams on vehicles, and more particularly relates to a tubular crush tower configured to absorb significant impact energy in a sequential consistent manner.

The federal government, insurance companies, agencies, associations, and companies concerned with vehicle safety have established standardized impact tests that vehicle bumper systems must pass. Crush towers are commonly used to support bumper bars on vehicle frames, and often are used to absorb energy during a vehicle impact. Several characteristics are beneficial for "successful" crush towers. It is desirable to manufacture crush towers that provide a consistent and predictable impact strength within a known narrow range, so that it is certain that the bumper systems on individual vehicles will all pass testing. Advantageously, a consistent and predictable impact strength lets manufacturers make a safer vehicle and also lets them more precisely optimize the bumper systems to reduce excess weight and to utilize lower cost materials. More specifically, it is desirable to manufacture crush towers that provide a predictable and consistent force-vs-deflection curve, and to provide a consistent energy absorption-vs-time curve, and to provide a consistent and predictable pattern of collapse. This lets vehicle manufacturers know with certainty how much deflection is created with any given impacting force, and how much energy is absorbed at any point during an impact or vehicle collision. In turn, this allows vehicle manufacturers to design enough room around the bumper system to permit a non-damaging impact without wasting space to compensate for product variation and to provide enough support to the bumper system on the vehicle frame. The force-vs-deflection curve has several important ranges at which the crush tower changes from elastic deformation to permanent deformation to total collapse and bottoming out. It is important that these various points of collapse be predictable, so that substantial amounts of energy are absorbed before and during collapse, but also so that collapse occurs before excessive loads are transferred through the bumper system into the vehicle and its passengers.

In addition to the above, bumper development programs require long lead times, and it is important that any crush tower be flexible, adaptable, and "tunable" so that it can be modified and tuned with predictability to optimize it on a given vehicle model late in a bumper development program. Also, it is desirable to provide a crush tower design that can be used on different bumper beams and with different bumper systems and different vehicle models, despite widely varied vehicle requirements, so that each new bumper system, although new, is not a totally untested and "unknown" system.

Some tubular crush towers are known for supporting bumper beams in a bumper system. In one type, two stamped half shells are welded together. However, this process generates raw material scrap. Also, the welding process is a secondary operation that adds to manufacturing overhead costs. Further, the welded crush towers are subject to significant product variation and significant variation in product impact strength, force-vs-deflection curves, energy absorption curves, and crush failure points.

Accordingly, a bumper system including a crush tower is desired solving the aforementioned problems and having the aforementioned advantages. In particular, a crush tower is desired that provides consistent impact strength, consistent force-vs-deflection curves, consistent energy absorption (elastic and permanent deformation), consistent collapse points and patterns, all of this within tight/narrow ranges of product and property variation. Also, a crush tower is desired that can be made with a reduced need for secondary operations and reduced need for manual labor.

SUMMARY OF THE PRESENT INVENTION

In one aspect of the present invention an energy-absorbing crush tower adapted to support a bumper on a vehicle includes a tube made of a continuous contiguous material. The tube has first and second ring sections connected by an interconnecting section. At least one of the first and second ring sections are heat-treated to a different material strength than the other of the first and second ring sections so that, upon receiving an end impact parallel a length of the tube, the first and second ring sections telescopingly collapse with a predictable and consistent multi-phase deformation sequence. By this arrangement, the crush tower is configured to absorb optimal levels of energy at particular telescopingly-collapsed distances.

In another aspect of the present invention, an energy-absorbing crush tower includes a tube made of a continuous contiguous material, with first and second ring sections connected by an interconnecting ring section. The interconnecting ring section defines a shape different than diameters of the first and second ring sections and defines a frustoconically-shaped ramp so that, upon receiving an end impact parallel a length of the tube, the first and second ring sections telescopingly collapse with a predictable and consistent multi-phase deformation sequence. By this arrangement, the crush tower is configured to absorb optimal levels of energy at particular telescopingly-collapsed distances.

In yet another aspect of the present invention, an energy-absorbing crush tower includes a tube having first and second ring sections connected by an interconnecting ring section that, upon impact in a direction parallel a length of the tube, is configured to cause the first and second ring sections to telescopingly collapse into each other with material of the tube folding back onto itself to form a third ring section between the first and second ring sections during an impact stroke that is longer than a length of the interconnection ring section. By this arrangement, the crush tower is configured to absorb optimal levels of energy at particular telescopingly-collapsed distances.

In still another aspect of the present invention, a method comprises steps of forming a crush tower for a bumper system adapted for attachment to a vehicle, the crush tower including a tube having first and second ring sections connected by an interconnecting ring section. The method further includes forming the interconnecting ring section on the tube to a shape different than the first and second ring sections, and heat-treating one of the first and second ring sections to a different material strength than the other of the first and second ring sections. By this method, upon impact to the bumper system in a direction parallel a length of the crush tower, the first and second ring sections telescopingly collapse into each other with a predictable level of energy absorption.

It is an object of the present invention to provide a crush tower with circumferentially formed grooves that crush and deform in a specific, repeatable, predictable and desired manner and sequence during the impact.

It is an object of the present invention to provide a crush tower made of a single continuous and contiguous material that will crush in a sequential manner.

It is an object of the present invention to provide a crush tower having tube sections, at least one of which is heat-treated to a different tensile strength than other of the tube sections.

It is an object of the present invention to provide a crush tower having tube sections that are configured to telescope into each other during a vehicle impact, rather than collapse like known crush towers where back-and-forth folded walls collapse against each other like an accordion.

It is an object of the present invention to provide a crush tower having tube sections connected by an interconnecting tube section that is frustoconically-shaped, with the frustoconically-shaped tube section leading one tube section into another during vehicle impact.

It is an object of the present invention to provide a crush tower having first and second tube sections connected by an interconnecting tube section, where, during a vehicle impact, the first section telescopes into the second tube section and the interconnecting tube section forms a third section trapped between the first and second tube sections during the stroke of impact, the third section undergoing significant but predictable deformation and energy absorption.

It is an object of the present invention to provide a crush tower having first and second tube sections connected by an interconnecting tube section, where the first and second and interconnecting tube sections telescope together in a predictable and highly repeatable sequential manner.

It is an object of the present invention to provide a crush tower that is highly adaptable to different bumper beams and bumper systems, and that can be modified and "tuned" to particular bumper beams and particular bumper systems, and that has predictable outcomes and results from such modifications, such as by modifying it with a heat-treating or annealing processes (e.g. larger annealed areas or annealing for greater changes in properties), modifying it by using thicker or thinner wall materials or by using materials of different hardnesses or properties, modifying it by changing tube length, diameters, radiuses, wall configurations or shape, and modifying it with surface changes.

These and other aspects, objects, and features of the present invention will be understood and appreciated by those skilled in the art upon studying the following specification, claims, and appended drawings.

BRIEF DESCRIPTION OF DRAWINGS

FIG. 1 is a horizontal cross sectional view of a bumper system including a mounting plate attached to a vehicle frame, a bumper beam, and a crush tower including opposite ends attached to the mounting plate and the bumper beam;

FIG. 2 is a view similar to FIG. 1, but with the crush tower collapsed a first (relatively short) distance; and FIG. 3 is a view similar to FIG. 2, but with the crush tower collapsed a second (longer) distance.

DETAILED DESCRIPTION OF PREFERRED EMBODIMENTS

A vehicle bumper system 10 (FIG. 1) includes a vehicle front bumper beam 11 with a mounting bracket, a vehicle frame including a rail mounting plate 12, and a crush tower 13 mounted between the bracket and the plate 12. The crush tower 13 comprises a tube made of a continuous contiguous material, such as a high-strength heat-treatable steel. The tube has first and second ring sections 14 and 15 connected by an interconnecting section 16. The interconnecting section 16 has a frustoconically-shaped portion 17 forming a funnel-shaped ramp. The first ring section 14 is heat-treated to a high material strength, such as about 120 KSI tensile strength, which is substantially higher than the second ring section 15, which is kept at about 60 KSI tensile strength. It is contemplated that the tensile strength of the first ring section 14 should be above the tensile strength of the second ring section 15 by a significant amount, such as about 10%, but preferably should be about double the tensile strength or about 60 KSI above it. This arrangement provides the stiffness necessary for the ring section 14 to telescope onto the ring section 15 and to provide bunching at the frustoconically-shaped portion 17 of the interconnecting section 16. By this arrangement, upon the bumper system 10 receiving an end impact parallel a length of the crush tower 13, the first and second ring sections 14 and 15 telescopingly collapse into each other with a predictable and consistent multi-phase deformation sequence where a third ring 18 (FIG. 2) begins to form and then does form (FIG. 3) between the first and second ring sections 14 and 15. Once the third ring 18 is fully formed, as limited by a length of the interconnecting section 16, material begins to buckle and bunch up at location 20 under the "hook" formed by the section 22. It is contemplated that additional ring sections and interconnecting sections could be provided if a vehicle model has enough room and additional energy absorption is desired before final bottoming out of the crush tower.

The illustrated bumper beam 11 is a tubular beam and is known in the art. For example, see Sturrus U.S. Pat. Nos. 5,092,512 and 5,813,594. These bumper beams can be linear or curved. Depending on their shapes, mounting brackets or plates can be used to provide a relatively flat mounting surface on the bumper adapted for attachment to a crush tower. (See FIG. 14 of U.S. Pat. No. 5,092,512 and FIG. 4 of U.S. Pat. No. 5,813,594.) Similarly, at the vehicle-connected end of a crush tower, a variety of different means can be used to provide a point of attachment for securing the crush towers to a vehicle frame.

The present inventive crush tower 13 is made from a single tubular shape. It is contemplated that the tubular shape initially will be rollformed and welded into a permanent tube to have a constant and circular cross section, with uniform walls having a constant thickness. Nonetheless, it is contemplated that non-circular tubes could also be used in the present invention.

After the tube is formed and cut to a desired length, the interconnecting section 16 is rolled or stamped to form an inwardly-deformed frustoconically-shaped portion 17 (shaped like a funnel) having a low angle to a centerline 21 of the tube, and an inwardly-deformed radiused "quick-out" portion 22 having a high angle to the centerline 21. The illustrated frustoconically-shaped portion 17 has a relatively linear funnel-shaped segment so that it forms a stiff ramp for guiding the ring section 15 into the ring section 14 during impact. Also, the quick-out portion 22 is radiused and angled so that it undergoes a bending force causing it to roll into a hook shape (see FIG. 2). This also helps the telescoping action of sections 14 and 15 during impact, as discussed below.

The internal cavity 25 within the crush tower 13 is open and stays open during impact. As a result, a component can be positioned within the cavity 25 without adversely affecting a performance of the crush tower 13. For example, a tow hook bushing can be located within the cavity 25 if desired.

In operation, the crush towers 13 are manufactured by making a tube, such as by rollforming, then rollforming into the tube the reduced-diameter interconnecting section and then by heat-treating the ring section 14 (and/or sections 15, 17, and 22). A pair of the crush towers 13 are then assembled into a bumper system 10 by attachment to the bumper beam 11, with the crush towers 13 being horizontally and laterally spaced from each other. The bumper system 10 is then attached to a vehicle frame. During impact, the interconnecting section 16 begins to buckle due to a linear strength of the ring section 14 and 15 along their centerline 21. In particular, the frustoconically-shaped portion 17 is driven under the quick-out portion 22 as the quick-out portion 22 doubles back upon itself, forming a hook-like ring that grips the portion 17. This provides a first stage of collapse at a first (lower) level of energy absorption. As the crush tower 13 undergoes further telescoping during a long stroke from a vehicle crash, an end of the interconnecting section 16 is bent over and drawn under the remaining material of ring section 14, thus forming the third ring section 18 between the ring sections 14 and 15. Thereafter, as the crush tower 13 is further crushed, the end of ring section 15 bends, buckles, and bunches up under the "hook" formed by the quick-out portion 22 of the interconnecting section 16. This sequential collapse and deforming of the various sections 14–16 is consistent and predictable, and results in a stepped energy absorption curve with increasingly high energy absorption at each sequential phase and with a relatively narrow range of variation.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. An energy-absorbing crush tower adapted to support a bumper on a vehicle, comprising:
   a tube made of a continuous contiguous material and that has first and second ring sections connected by an interconnecting section, at least one of the first and second ring sections being heat-treated to a different material strength than the other of the first and second ring sections so that, upon receiving an end impact parallel a length of the tube, the first and second ring sections telescopingly collapse with a predictable and consistent multi-phase deformation sequence, the first and second ring sections each being cylindrically-shaped and defining diameters, and the interconnecting section having at least one transverse cross section that is circular and that defines a diameter different than the diameters of the first and second ring sections, and wherein the diameter of the interconnecting section is smaller than the diameter of the first and second ring sections, whereby the crush tower is configured to absorb optimal levels of energy at particular telescopingly-collapsed distances.

2. An energy-absorbing crush tower adapted to support a bumper on a vehicle, comprising:
   a tube made of a continuous contiguous material and that has first and second ring sections connected by an interconnecting section, at least one of the first and second ring sections being heat-treated to a different material strength than the other of the first and second ring sections so that, upon receiving an end impact parallel a length of the tube, the first and second ring sections telescopingly collapse with a predictable and consistent multi-phase deformation sequence, wherein the interconnecting section has a frustoconically-shaped portion shaped to lead the first ring section into the second ring section upon impact and telescoping collapse of the crush tower, and ha at least one additional frustoconically-shaped portion whereby the crush tower is configured to absorb optimal levels of energy at particular telescopingly-collapsed distances.

3. An energy-absorbing crush tower adapted to support a bumper on a vehicle, comprising:
   a tube made of a continuous contiguous material and that has first and second ring sections connected by an interconnecting section, at least one of the first and second ring sections being heat-treated to a different material strength than the other of the first and second ring sections so that, upon receiving an end impact parallel a length of the tube, the first and second ring sections telescopingly collapse with a predictable and consistent multi-phase deformation sequence, wherein the be defines a longitudinal center line, and the interconnecting section has a first portion that extends at a smaller angle to the center line and has a second portion that extends at a larger angle to the center line, whereby the crush tower is configured to absorb optimal levels of energy at particular telescopingly-collapsed distances.

4. The crush tower defined in claim 3, wherein the first and second ring sections each are cylindrically-shaped and define diameters.

5. The crush tower defined in claim 4, wherein the interconnecting section defines a shape different than the diameters of the first and second ring sections.

6. The crush tower defined in claim 4, wherein the interconnecting section has at least one transverse cross section that is circular and defines a diameter different than the diameters of the first and second ring sections.

7. The crush tower defined in claim 3, wherein the interconnecting section has a frustoconically-shaped portion shaped to lead the first ring section into the second ring section upon impact and telescoping collapse of the crush tower.

8. An energy-absorbing crush tower adapted to support a bumper on a vehicle, comprising:
   a tube made of a continuous contiguous material and that has first and second ring sections connected by an interconnecting section, at least one of the first and second ring sections being heat-treated to a different material strength than the other of the first and second ring sections so that, upon receiving an end impact parallel a length of the tube, the first and second ring sections telescopingly collapse with a predictable and consistent multi-phase deformation sequence, wherein the first ring section has a tensile strength that is at least about 60 KSI, and the second ring section has a tensile strength that is at least about 10% above the tensile strength of the first ring section whereby the crush tower is configured to absorb optimal levels of energy at particular telescopingly-collapsed distances.

9. An energy-absorbing crush tower adapted to support a bumper on a vehicle, comprising:
   a tube made of a continuous contiguous material and that has first and second ring sections connected by an interconnecting section, at least one of the first and second ring sections being heat-treated to a different material strength than the other of the first and second ring sections so that, upon receiving an end impact parallel a length of the tube, the first and second ring sections telescopingly collapse with a predictable and consistent multi-phase deformation sequence, wherein the first and second ring sections, before being impacted and telescoped together, have the same diameter whereby the crush tower is configured to absorb optimal levels of energy at particular telescopingly-collapsed distances.

10. The crush tower defined in claim 9, including a bumper and a vehicle frame, and wherein the first ring section is attached to the bumper and the second ring section is attached to the vehicle frame.

11. The crush tower defined in claim 10, wherein the first ring section is attached to a first portion of the interconnecting section and the second ring section is attached to a second portion of the interconnecting section.

12. The crush tower defined in claim 9, wherein the interconnecting section includes a portion shaped to deform into a hook-shaped ring when the first and second ring sections are initially telescoped together, the hook-shaped ring causing material of at least one of the first and second ring section to bunch up and bend and crush onto each other as the first and second ring sections are further telescoped together.

13. An energy-absorbing crush tower adapted to support a bumper on a vehicle, comprising:

a tube made of a continuous contiguous material and that has first and second ring sections connected by an interconnecting ring section, the interconnecting ring section defining a shape smaller than diameters of the first and second ring sections and defining a frustoconically-shaped ramp so that, upon receiving an end impact parallel a length of the tube, the first and second ring sections telescopingly collapse with a predictable and consistent multi-phase deformation sequence, whereby the crush tower is configured to absorb optimal levels of energy at particular telescopingly-collapsed distances.

14. The crush tower defined in claim 13, wherein at least one of the first and second ring sections are heat-treated to a different material strength than the other of the first and second ring sections.

15. An energy-absorbing crush tower adapted to support a bumper on a vehicle, comprising:

a tube having first and second ring sections connected by an interconnecting ring section having a smaller diameter than the first and second ring sections so that, upon impact in a direction parallel a length of the tube, the interconnecting ring section is configured to cause the first and second ring sections to telescopingly collapse into each other with material of the tube folding back onto itself to form a third ring section between the first and second ring sections during a impact stroke that is longer than a length of the interconnecting ring section, whereby the crush tower is configured to absorb optimal levels of energy at particular telescopingly-collapsed distances;

wherein at least one of the first and second ring sections are heat-treated to a different material strength than the other of he first and second ring sections.

* * * * *

UNITED STATES PATENT AND TRADEMARK OFFICE
CERTIFICATE OF CORRECTION

PATENT NO. : 6,648,384 B2
DATED : November 18, 2003
INVENTOR(S) : Rainer B. Nees et al.

It is certified that error appears in the above-identified patent and that said Letters Patent is hereby corrected as shown below:

<u>Column 6,</u>
Line 5, "ha" should be -- has --;
Line 20, "be" should be -- tube --;

<u>Column 8,</u>
Line 6, change "." to -- ; --;
Line 30, add the following new paragraph -- wherein at least one of the first and second ring sections are heat-treated to a different material strength than the other of the first and second ring sections. --;
Line 22, "a" should be -- an --;
Line 29, "he" should be -- the --.

Signed and Sealed this

Thirteenth Day of April, 2004

JON W. DUDAS
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,648,384 B2 | Page 1 of 1 |
| APPLICATION NO. | : 09/964914 | |
| DATED | : November 18, 2003 | |
| INVENTOR(S) | : Rainer B. Nees et al. | |

It is certified that error appears in the above-identified patent and that said Letters Patent is hereby corrected as shown below:

<u>Column 6,</u>
Line 5, "ha" should be -- has --;
Line 20, "be" should be -- tube --;

<u>Column 8,</u>
Line 6, change "." to -- ; --;
Line 7, add the following new paragraph -- wherein at least one of the first and second ring sections are heat-treated to a different material strength than the other of the first and second ring sections. --;
Line 22, "a" should be -- an --;
Line 29, "he" should be -- the --.

This certificate supersedes the Certificate of Correction issued April 13, 2004.

Signed and Sealed this

Fourth Day of March, 2008

JON W. DUDAS
*Director of the United States Patent and Trademark Office*